US011800557B2

(12) United States Patent
Wu et al.

(10) Patent No.: US 11,800,557 B2
(45) Date of Patent: Oct. 24, 2023

(54) TRANSPORT BLOCK SIZE FOR CONTENTION FREE RANDOM ACCESS IN RANDOM ACCESS PROCEDURE

(71) Applicant: Nokia Technologies Oy, Espoo (FI)

(72) Inventors: Chunli Wu, Beijing (CN); Samuli Turtinen, Ii (FI); Benoist Sebire, Tokyo (JP); Haitao Li, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/252,960

(22) PCT Filed: Jun. 21, 2018

(86) PCT No.: PCT/CN2018/092264
§ 371 (c)(1),
(2) Date: Dec. 16, 2020

(87) PCT Pub. No.: WO2019/241978
PCT Pub. Date: Dec. 26, 2019

(65) Prior Publication Data
US 2021/0195657 A1    Jun. 24, 2021

(51) Int. Cl.
*H04W 74/08* (2009.01)
*H04L 5/00* (2006.01)
*H04W 74/04* (2009.01)

(52) U.S. Cl.
CPC ........... *H04W 74/04* (2013.01); *H04L 5/0044* (2013.01); *H04W 74/0833* (2013.01)

(58) Field of Classification Search
CPC ... H04L 5/0044; H04L 5/0048; H04L 5/0053; H04W 74/04; H04W 74/0833
See application file for complete search history.

(56) References Cited

U.S. PATENT DOCUMENTS

2018/0324653 A1* 11/2018 Nagaraja ........... H04W 36/0077
2019/0116613 A1*  4/2019 Abedini ................ H04W 74/02
(Continued)

FOREIGN PATENT DOCUMENTS

| CN | 101908951 A | 12/2010 |
|----|-------------|---------|
| CN | 106717077 A |  5/2017 |

(Continued)

OTHER PUBLICATIONS

Japanese Office Action corresponding to JP Application No. 2020-571456, dated Aug. 23, 2022.
(Continued)

*Primary Examiner* — Derrick V Rose
(74) *Attorney, Agent, or Firm* — SQUIRE PATTON BOGGS (US) LLP

(57) ABSTRACT

Embodiments of the present disclosure relate to methods, devices and computer readable storage media for determining a transport block size (TBS) for Contention Free Random Access (CFRA) in a random access procedure. In example embodiments, a CFRA request is transmitted by a terminal device to a network device during a random access procedure. The terminal device receives a random access response to the CFRA request from the network device. The random access response indicates a TBS granted by the network device for use in transmission. Based on the granted TBS, the terminal device transmits, to the network device, a first data block with the granted TBS or a second data block to be transmitted and stored in a buffer. In this way, the data loss may be avoided, and the data transmission efficiency may be improved.

6 Claims, 3 Drawing Sheets

(56) References Cited

U.S. PATENT DOCUMENTS

| | | | | |
|---|---|---|---|---|
| 2019/0342921 | A1* | 11/2019 | Loehr | H04L 5/0094 |
| 2019/0364605 | A1* | 11/2019 | Loehr | H04L 5/003 |
| 2020/0137798 | A1* | 4/2020 | Bergquist | H04W 80/02 |
| 2021/0058824 | A1* | 2/2021 | Choe | H04W 76/27 |
| 2021/0195633 | A1* | 6/2021 | Ohara | H04L 5/0053 |

FOREIGN PATENT DOCUMENTS

| | | |
|---|---|---|
| CN | 107624262 A | 1/2018 |
| KR | 2013-0009959 A | 1/2013 |
| WO | 2011/100596 A2 | 8/2011 |
| WO | 2017/073135 A1 | 5/2017 |
| WO | 2017/164626 A2 | 9/2017 |
| WO | 2017/195848 A1 | 11/2017 |

OTHER PUBLICATIONS

Office action received for corresponding Korean Patent Application No. 2021-7001901, dated Mar. 3, 2022, 6 pages of Office Action and 2 pages of translation available.

Extended European Search Report received for corresponding European Patent Application No. 18923240.8, dated Dec. 22, 2021, 11 pages.

"RACH procedure", 3GPP TSG RAN WG1 Meeting NR#2, R1-1710271, Agenda Item: 5.1.1.4.4, LG Electronics, Jun. 27-30, 2017, 4 pages.

"Beam recovery using RA procedure", 3GPP TSG-RAN WG2#100, R2-1713380, Agenda Item: 10.3.1.4.2, Nokia, Nov. 27-Dec. 1, 2017, 5 pages.

"Beam Recovery in NR", 3GPP TSG-RAN WG1 meeting #91, R1-1720891, Agenda Item: 7.2.2.4, Nokia, Nov. 27-Dec. 1, 2017, 6 pages.

Office action received for corresponding Indian Patent Application No. 202147000596, dated Jan. 4, 2022, 6 pages.

"3rd Generation Partnership Project; Technical Specification Group Radio Access Network; NR; Physical layer procedures for data (Release 15)", 3GPP TS 38.214, V15.1.0, Mar. 2018, pp. 1-77.

"Discussion on Random Access Preamble selection for Handover", 3GPP TSG-RAN WG2 Meeting #102, R2-1806919, Agenda Item: 10.3.1.4.2, ASUSTeK, May 21-25, 2018, 4 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.1.0, Mar. 2018, pp. 1-109.

"Report on email discussion [101bis#77] RRC-MAC interaction in EDT", 3GPP TSG-RAN WG2 #102, R2-1807797, Agenda Item: 9.14.2, Ericsson, May 21-25, 2018, 17 pages.

"3rd Generation Partnership Project; Technical Specification Group Radio Access Network; NR; Medium Access Control (MAC) protocol specification (Release 15)", 3GPP TS 38.321, V15.2.0, Jun. 2018, pp. 1-73.

International Search Report and Written Opinion received for corresponding Patent Cooperation Treaty Application No. PCT/CN2018/092264, dated Mar. 25, 2019, 9 pages.

Office action received for corresponding Japanese Patent Application No. 2020-571456, dated Feb. 8, 2022, 3 pages of Office Action and 4 pages of translation available.

"Msg3 handling in early data transmission",3GPP TSG-RAN WG2 #101, R2-1803073, Agenda Item: 9.14.2, Ericsson, Feb. 26-Mar. 2, 2018, pp. 1-4.

Chinese Office Action corresponding to CN Application No. 201880096781.5, dated Oct. 21, 2022.

Japanese Office Action with English language summary, corresponding to JP Application No. 2020-571456, dated Jul. 25, 2023.

3GPP TS 36.213 V15.1.0 (Mar. 2018), 3rd Generation Partnership Project; Technical Specification Group Radio Access Network; Evolved Universal Terrestrial Radio Access (E-UTRA); Physical layer procedures (Release 15), 5 pages.

\* cited by examiner

TRANSPORT BLOCK SIZE FOR CONTENTION FREE RANDOM ACCESS IN RANDOM ACCESS PROCEDURE

RELATED APPLICATION

This application claims priority to PCT Application No. PCT/CN2018/092264, filed on Jun. 21, 2018, which is incorporated herein by reference in its entirety.

FIELD

Embodiments of the present disclosure generally relate to the field of communications, and in particular, to methods, devices and computer readable storage media for determining a transport block size (TBS) for Contention Free Random Access (CFRA) in a random access procedure.

BACKGROUND

For New Radio (NR), it is agreed that user equipment (UE) may operate on multiple beams. In addition to Contention Based Random Access (CBRA) resources or preambles, the UE may use Contention Free Random Access (CFRA) resources/preambles in a Random Access (RA) procedure, for example, in the scenario of handover or beam failure recovery. When the UE initiates a random access procedure, the UE first attempts to detect candidate beams, for example, Synchronization Signal Block (SSB) beams or Channel State Information Reference Signal (CSI-RS) beams, with CFRA resources available. If none of the beams are detected, for example, none of Reference Signal Receiving Powers (RSRPs) on the beams are above a predetermined threshold, the UE will select a beam/SSB with the CBRA resources available. Such selection may be performed for each of subsequent preamble reattempts.

If the CFRA preamble is selected, the random access procedure is successfully completed upon the reception of a Random Access Response (RAR) from the network which may also be referred to as message 2 (Msg2). Then, the UE will use a message 3 (Msg3) buffer for transmission of uplink (UL) data during the random access procedure in case there is a MAC PDU in the Msg3 buffer available. Furthermore, in a hybrid automatic repeat request (HARQ) procedure, regardless of whether to attempt the random access procedure with the CBRA or CFRA resources, the UE is required to transmit a media access control (MAC) Protocol Data Unit (PDU) available in the Msg3 buffer as long as the SSB associated with the CBRA resources is selected at least once for the random access procedure.

According to the current specifications, whenever the CBRA preamble attempt is failed during the RA procedure and then the CFRA preamble attempt is performed if the SSB/CSI-RS assigned with the dedicated preamble for CFRA has the RSRP above the threshold, the MAC PDU in the Msg3 buffer should be transmitted. In this case, an UL grant provided in a RAR to the CFRA preamble may not be able to allocate the same Transport Block size (TBS) as an UL grant provided in a RAR to the CBRA preamble, as a NR NodeB (for example, gNB) does not know which preamble group was used for the CBRA preamble when receiving the dedicated preamble for CFRA.

SUMMARY

In general, example embodiments of the present disclosure provide methods, devices and computer readable storage media for determining a TBS for CFRA in a random access procedure.

In a first aspect, a method is provided at a terminal device. A contention free random access (CFRA) request is transmitted to a network device during a random access procedure. The terminal device receives a random access response to the CFRA request. The random access response indicating a TBS granted by the network device for use in transmission. Based on the granted TBS, the terminal device transmits, to the network device, a first data block with the granted TBS or a second data block to be transmitted and stored in a buffer.

In a second aspect, a method is provided at a terminal device. If the terminal device determines that contention free random access (CFRA) resources have been provided for a random access procedure, the terminal device determines contention based random access (CBRA) resources available during the random access procedure. Then, the terminal device transmits, to a network device, a CBRA request with the available CBRA resources during the random access procedure.

In a third aspect, there is provided a device comprising at least one processor and at least one memory including computer program code. The at least one memory and the computer program code are configured to, with the at least one processor, cause the device to perform the method according to the first or second aspect.

In a fourth aspect, there is provided a computer readable storage medium that stores a computer program thereon. The computer program, when executed by a processor, causes the processor to perform the method according to the first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
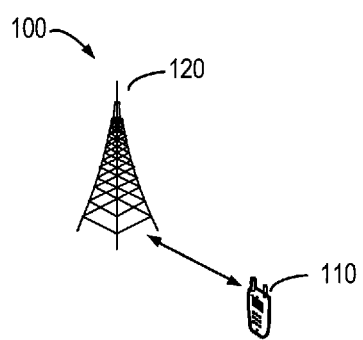
FIG. 1 illustrates an example environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a NR NodeB (gNB), a Remote Radio Module (RRU), a radio header (RH), a remote radio head (RRH), a low power node such as a femto, a pico, and the like.

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, some embodiments will be described with reference to UEs as examples of the terminal devices, and the terms "terminal device" and "user equipment" (UE) may be used interchangeably in the context of the present disclosure.

As used herein, the term "contention free random access" refers to a random access attempt using the dedicated preambles configured in the network to avoid collisions of access attempts from different terminal devices.

As used herein, the term "contention based random access" refers to a random access attempt using the same set of preambles in a cell. In such a random access procedure, there is a possibility that the same preamble is used by multiple terminal devices and the preambles from the terminal devices reach the network device at the same time. That is, there may be collisions of the access attempts from different terminal devices.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

When the UE triggers a random access procedure, for example, for beam failure recovery, the UE may attempt to detect the candidate beams (for example, SSB or CSI-RS beams) configured with the CFRA resources. If none of the beams are detected, the UE may select the beam/SSB and use the CBRA resources. 3GPP TS 38.321 at section 5.1.2 specifies the operations at a MAC layer in such a RA procedure as below:

5.1.2 Random Access Resource selection
( . . . )
The MAC entity shall:
1> if the Random Access procedure was initiated for beam failure recovery (as specified in subclause 5.17); and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the associated SSBs or the CSI-RSs with CSI-RSRP above csirs-Threshold amongst the associated CSI-RSs is available:
2> select an SSB with SS-RSRP above rsrp-ThresholdSSB amongst the associated SSBs or a CSI-RS with CSI-RSRP above csirs-Threshold amongst the associated CSI-RSs;
2> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by either PDCCH or RRC; and
1> if the ra-PreambleIndex is not 0b000000; and
1> if contention-free Random Access Resource associated with SSBs or CSI-RS have not been explicitly provided by RRC:
2> set the PREAMBLE_INDEX to the signalled ra-PreambleIndex.
1> else if the contention-free Random Access Resources associated with SSBs have been explicitly provided by RRC and at least one SSB with SS-RSRP above rsrp-ThresholdSSB amongst the associated SSBs is available:
2> select an SSB with SS-RSRP above rsrp-ThresholdSSB amongst the associated SSBs;
2> set the PREAMBLE_INDEX to a ra-PreambleIndex corresponding to the selected SSB.
1> else if the contention-free Random Access Resources associated with CSI-RSs have been explicitly provided by RRC and at least one CSI-RS with CSI-RSRP above csirs-Threshold amongst the associated CSI-RSs is available:
  2> select a CSI-RS with CSI-RSRP above csirs-Threshold amongst the associated CSI-RSs;
  2> set the PREAMBLE_INDEX to a ra-PreambleIndex corresponding to the selected CSI-RS.
1> else:
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> if Msg3 has not yet been transmitted:

From the above specification, it can be seen that the SSB is selected using the CBRA resources when no beam provided with the dedicated preambles for the CFRA has a RSRP (for example, SS-RSRP or CSI-RSRP) above the predetermined threshold (for example, rsrp-ThresholdSSB or csirs-Threshold, respectively).

If the CFRA preamble is selected, the RA procedure is successfully completed upon the reception of a RAR. Then, the UE will use the Msg3 buffer for transmission of UL data in the RA procedure in case a CBRA preamble is transmitted during the RA procedure and the RAR received in response to it (otherwise the Msg3 buffer would be empty). 3GPP TS 38.321 at section 5.1.4 specifies the operations at the MAC layer as below:

5.1.4 Random Access Response reception
( . . . )
  4> if the Random Access Preamble was not selected by the MAC entity among the contention-based Random Access Preamble(s):
    5> consider the Random Access procedure successfully completed.
  4> else:
    5> set the TEMPORARY_C-RNTI to the value received in the Random Access Response;
    5> if this is the first successfully received Random Access Response within this Random Access procedure:
      6> if the transmission is not being made for the CCCH logical channel:
        7> indicate to the Multiplexing and assembly entity to include a C-RNTI MAC CE in the subsequent uplink transmission.
      6> obtain the MAC PDU to transmit from the Multiplexing and assembly entity and store it in the Msg3 buffer.

However, in a HARQ procedure, regardless of whether the random access procedure was attempted with the CBRA or CFRA resources, the UE is required to transmit a MAC PDU available in the Msg3 buffer as long as the SSB associated with only the CBRA resources is selected at least once for the random access procedure as specified in section 5.1.4 of 3GPP TS 38.321 as below:

5.4.2 HARQ operation
( . . . )
For each uplink grant, the HARQ entity shall:
  1> identify the HARQ process associated with this grant, and for each identified HARQ process:
    2> if the received grant was not addressed to a Temporary C-RNTI on PDCCH, and the NDI provided in the associated HARQ information has been toggled compared to the value in the previous transmission of this TB of this HARQ process; or
    2> if the uplink grant was received on PDCCH for the C-RNTI and the HARQ buffer of the identified process is empty; or
    2> if the uplink grant was received in a Random Access Response; or
    2> if the uplink grant is part of a bundle of the configured grant, and may be used for initial transmission according to subclause 6.1.2.3 of TS 38.214 [7], and if no MAC PDU has been obtained for this bundle:
      3> if there is a MAC PDU in the Msg3 buffer and the uplink grant was received in a Random Access Response:
        4> obtain the MAC PDU to transmit from the Msg3 buffer.
      3> else:
        4> obtain the MAC PDU to transmit from the Multiplexing and assembly entity, if any;

As stated above, the transmission of the MAC PDU in the Msg3 buffer is also applicable for CFRA in the case of beam failure recovery and other cases, assuming including the case of the Random Access Response (RAR) scheduled via both RA-RNTI and C-RNTI. Otherwise, the data from Msg3 buffer will be lost if a new MAC PDU is always obtained for CFRA from the multiplexing and assembly entity.

Whenever the CBRA preamble attempt is failed during the RA procedure and then the CFRA preamble attempt is performed, if the SSB/CSI-RS assigned with the dedicated preamble for CFRA has the RSRP above the threshold, the MAC PDU in the Msg3 buffer should be transmitted. In this case, an UL grant provided in a RAR to the CFRA preamble may not be able to allocate the same TBS as an UL grant provided in a RAR to the CBRA preamble, as a NR nodeB (for example, gNB) does not know which preamble group was used for the CBRA preamble when receiving the dedicated preamble for CFRA. In fact, the NR NodeB may not even know if the CBRA preamble was attempted before the CFRA preamble transmission. Data loss may occur since the MAC PDU in the Msg3 buffer may not be able to be multiplexed in a different size of TBS/grant.

One conventional approach to address the above issues due to such switching between CBRA and CFRA proposes that during random access resource selection for handover, the UE shall not select a random access preamble among the contention-free Random Access preambles if Msg3 has been transmitted in the current random access procedure, that is, if a CBRA preamble has been selected once in the RA procedure. However, this approach may cause a waste of the dedicated resources and increase the load unnecessarily among the contention based preambles.

In long term evolution (LTE), there is no such switching between CBRA and CFRA. The CFRA and CBRA procedures are implemented separately. The CFRA procedure is completed after the RAR containing the identifier (ID) of the CFRA preamble is received. In this case, the UL grant in the RAR will be considered as the UL grant for new transmission, and there is no data in the msg3 buffer for CFRA.

The LTE MAC specification, for example, 3GPP TS 36.321, describes that UE behaviour is not specified when a msg3 size changes with the assumption that an eNB can avoid the change by allocating the same size according to the preamble groups. However, it is unrelated to the switching from CBRA to CFRA.

The actions of the UE when the TBS changes during the random access procedure have been discussed for Narrowband Internet of Things (NB-IoT)/Machine Type Communication (MTC), but no conclusion is reached. For example, it is proposed to discuss whether anything needs to be specified for the case that different sets of TB sizes are provided in an Early Data Transmission (EDT) grant for re-attempts of Msg3 transmission, for example, whether the UE shall rebuild the Msg3 with the smallest TBS which all the data would fit. Regarding the issue of HARQ retransmission during the random access procedure, it is proposed that Radio Access Network (RAN) Working Group 2 (WG2) of the 3rd Generation Partnership Project (3 GPP) waits for the conclusion from Radio Access Network (RAN) Working Group 1 (WG1) of the 3 GPP.

Embodiments of the present disclosure provide schemes of determining a granted transport block size (TBS), for example, for Msg3, when a random access procedure is performed by using a CBRA request (for example, a CBRA preamble or physical random access channel (PRACH) resources or contention based random access resources) or completed by using a CFRA request (for example, a CFRA preamble or physical random access channel (PRACH) resources or contention free random access resources). The granted TBS may be associated with the first CBRA request available to the terminal device during the random access procedure. As such, the TBS for at least the second CBRA request and/or a CFRA request may consist of the TBS for the first CBRA request. The data loss may be avoided, and the data transmission efficiency may be improved.

FIG. 1 shows an example environment 100 in which embodiments of the present disclosure can be implemented. The environment 100, which is a part of a communication network, includes a terminal device 110 and a network device 120. It is to be understood that one terminal device and one network device are shown only for the purpose of illustration without suggesting any limitation to the scope of the present disclosure. The environment 100 may include any suitable number of terminal devices and network devices adapted for implementing embodiments of the present disclosure.

The terminal device 110 can communicate with the network device 120 or with another terminal device 110 directly or via the network device 120. The communication may follow any suitable communication standards or protocols such as Universal Mobile Telecommunications System (UMTS), long term evolution (LTE), LTE-Advanced (LTE-A), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC) and ultra-reliable low latency communication (uRLLC) technologies.

During the random access procedure, the terminal device 110 can send a CFRA request (for example, a CFRA preamble) to the network device 120 and then receives from the network device 120 a RAR to the CFRA request. Upon the reception of the RAR, the terminal device 110 determines a TBS granted by the network device 120 and uses the TBS for uplink data transmission, for example, in msg3. The RAR may be understood to be scheduled via physical downlink control channel (PDCCH) transmission addressed to Random Access Radio Network Temporary Identifier (RA-RNTI) or Cell Radio Network Temporary Identifier (C-RNTI).

Figure 2:
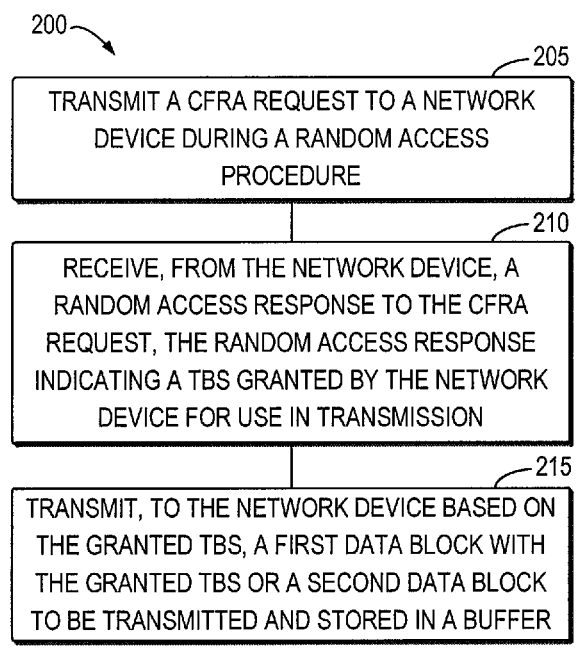
FIG. 2 illustrates a flowchart of an example method in accordance with some embodiments of the present disclosure.

FIG. 2 shows a flowchart of an example method 200 in accordance with some embodiments of the present disclosure. The method 200 can be implemented at the terminal device 110 as shown in FIG. 1. For the purpose of discussion, the method 200 will be described with reference to FIG. 1.

At block 205, the terminal device 110 transmits a CFRA request to the network device 120. The CFRA request may be implemented by a CFRA preamble transmission. At block 210, the terminal device 110 receives a RAR from the network device 120. The RAR indicates a TBS granted by the network device 210 for use in transmission.

The granted TBS for the CFRA request may be associated with CBFA resources available to the terminal device. As such, the TBS configured by the network device 120 as a response to the CFRA request from the terminal device 110 may consist with the TBS configured by the network device 120 as a response to the CBRA request from the terminal device 110. In some embodiments, the CBRA resources available to the terminal device 110 may be predefined. For example, it may be specified that the terminal device 110 selects for the CBRA preamble from Random Access Preambles group A since this group generally exists. This may be subject to the determination that the CFRA preambles or physical random access channel (PRACH) resources or contention free random access resources are configured for the UE. Then, the network device 120 may determine a TBS associated with Random Access Preambles group A as the granted TBS also in response to the CFRA preamble transmission by the terminal device 110. As another example, it may be specified that as long as Random Access Preambles group B is available (for example, in a cell), the terminal device 110 selects for the CBRA preamble from Random Access Preambles group B during the RA procedure in case CFRA resources are provided to the UE in use for a Random Access procedure. Accordingly, the network device 120 may determine a TBS associated with Random Access Preambles group B as the granted TBS as a response to the CFRA preamble from the terminal device 110.

In some embodiments, the available CBRA resources may be indicated by the network device 120 to the terminal device 110, for example, in high layer signaling, such as radio resource control (RRC) signaling. As an example, Random Access Preambles group B may be configured by the network device 120 to the terminal device 110 in RRC signaling. In this case, the terminal device 110 may select the CBRA preamble from Random Access Preambles group B only, if needed. The network device 120 then determines the TBS associated with this group as the granted TBS for the CFRA request from the terminal device 110. In some examples, in case network device 120 does not configure which one of the Random Access Preambles group A or B to use, the terminal device 110 uses group A.

In some embodiments, the terminal device 110 may transmit a CBRA request to the network device 120 during the random access procedure. In these embodiments, the terminal device 110 may first determine the available CBRA resources and then send the CBRA request (for example, a CBRA preamble) with the available CBRA resources.

An example process of determining the available CBRA resources at the terminal device 110 will be discussed below. The terminal device 110 may first determine whether CFRA resources associated with SSBs or CSI-RSs have been explicitly provided by RRC signaling. If the CFRA resources are not provided, the terminal device 110 determines whether Random Access Preambles group B is configured. If Random Access Preambles group B is configured, the terminal device 110 may select the CBRA preamble from Random Access Preambles group B. Otherwise, the terminal device 110 may select the CBRA preamble from Random Access Preambles group A. If it is determined that the CFRA resources associated with the SSBs or CSI-RSs have been explicitly provided by the RRC signaling, the terminal device 110 determines whether Random Access Preambles group A or B can be used. The terminal device 110 may determine whether Random Access Preambles group B is configured and whether mandating the usage of Random Access Preambles group B (e.g., an information element (IE) usePreambleGroupBwithCFRA is configured by the NW) is configured in this case. If Random Access Preambles group B is configured and usePreambleGroupBwithCFRA is configured, the terminal device 110 may select the CBRA preamble from Random Access Preambles group B. Otherwise, the terminal device 110 may select the CBRA preamble from Random Access Preambles group A.

After obtaining the granted TBS, at block 215, the terminal device 110 transmits, to the network device 120 based on the granted TBS, a data block (referred to as a first data block), for example, a PDU, with the granted TBS or a data block (referred to as a first data block) to be transmitted and stored in a buffer.

In some embodiments, the terminal device 110 may generate the first data block based on the granted TBS regardless of a size of the second data block in the buffer for storing data to be transmitted. The buffer may include the Msg3 buffer or a HARQ buffer. For example, if it is determined that the Msg3 buffer stores the MAC PDU, the Msg3 buffer may be flushed.

In some embodiments, before the flushing, the terminal device 110 may compare the granted TBS and a block size of the second data block in the buffer. If the granted TBS is smaller than the block size of the second data block, the buffer is flushed. As such, unnecessary transmission of the C-RNTI MAC CE may be avoided for CFRA and no issue of different granted TBSs exists in the random access procedure.

Upon the flushing of the buffer, the terminal device 110 generates the first data block with the granted TBS. In some embodiments, the flush may be indicated from a MAC layer to a radio link control (RLC) layer. Then, one or more RLC PDU are re-generated and multiplexed into a MAC PDU with the granted TBS as the first data block. The regeneration of the RLC PDU may not be counted as a RLC retransmission for a RLC service data unit (SDU) corresponding to the RLC PDU. This may be applicable to any RLC mode, such as Acknowledged Mode (AM), Unacknowledged Mode (UM), and Transparent Mode (TM).

In some other embodiments, the regeneration and multiplexing of the RLC PDUs to the MAC PDU at the RLC layer may be restricted whenever the random access procedure uses the CFRA resource. In this case, the terminal device 110 may select the first data block with the granted TBS from a set of data blocks to be transmitted. For example, the MAC entity may obtain the MAC PDU to transmit from the Multiplexing and Assembly entity.

If the granted TBS is equal to the block size of the second data block, the terminal device 110 may obtain the second data block as the first data block. If the granted TBS is larger than the block size of the second data block, the terminal device 110 may generate the first data block based on the second block. In some embodiments, the terminal device 110 may add padding to the second data block to generate the first data block with the granted TBS. For example, the MAC entity may submit the second data block to the Multiplexing and Assembly entity for the padding processing.

In some embodiments, the network device (for example, the gNB) may grant the TBS not smaller than that granted for the CBRA in a cell. As such, no re-segmentation is needed at a RLC layer. Padding may be added to a MAC PDU at a MAC layer when regenerating the msg3 with a changed TBS.

Figure 3:
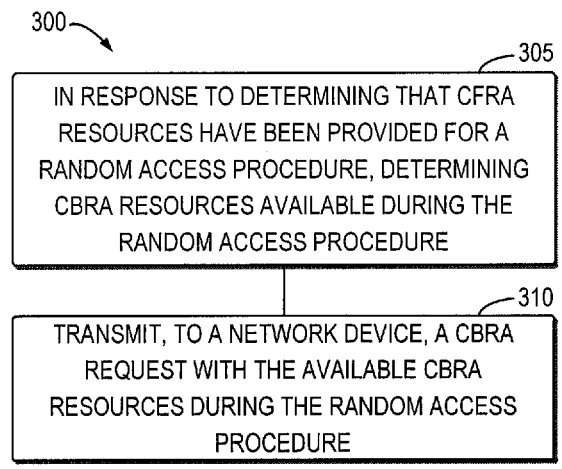
FIG. 3 illustrates a flowchart of an example method in accordance with some other embodiments of the present disclosure.

FIG. 3 shows a flowchart of an example method 300 in accordance with some other embodiments of the present disclosure. The method 300 can be implemented at the terminal device 110 as shown in FIG. 1. For the purpose of discussion, the method 300 will be described with reference to FIG. 1.

At block 305, in response to determining that contention free random access (CFRA) resources have been provided for a random access procedure, the terminal device 110 determines contention based random access (CBRA) resources available during the random access procedure. The CBRA resources may comprise of an available group of preambles which may comprise at least one of the: Random Access Preambles group A and Random Access Preambles group B.

The available CBRA resources may be determined by the terminal device 110 in any suitable way. In some embodiments, the available CBRA resources are predefined in the network, as described above. In some embodiments, the terminal device 110 may receive an indication of the available CBRA resources from the network device 120. In some embodiments, the indication of the available CBRA resources from the network device 120 may be provided together with providing the CFRA resources. In some embodiments, the indication of the available CBRA resources from the network device 120 may be provided only in case the available CBRA resources comprise of Random Access Preambles group B; and in case the indication is not provided, terminal device 110 determines Random Access Preambles group A as the available group of preambles.

In some embodiments, the terminal device 110 may determine whether Random Access Preambles group B is configured. If Random Access Preambles group B is configured, the terminal device 110 may determine Random Access Preambles group B as the available group of preambles. If Random Access Preambles group B is not configured, the terminal device 110 may determine Random Access Preambles group A as the available group of preambles.

In some embodiments, the terminal device 110 may always determine Random Access Preambles group A as the available group of preambles.

In some embodiments, the terminal device 110 may determine whether Random Access Preambles group B is configured and whether an information element (IE) usePreambleGroupBwithCFRA is configured. If Random Access Preambles group B is configured and the IE usePreambleGroupBwithCFRA is configured, the terminal device 110 may determine Random Access Preambles group B as the available group of preambles. Otherwise, the terminal device 110 may determine Random Access Preambles group A as the available group of preambles.

At block 310, the terminal device 110 transmits, to the network device 120, a CBRA request with the available CBRA resources during the random access procedure. For example, the terminal device 110 may transmit a CBRA preamble selected from the available group of preambles.

All operations and features related to the terminal device 110 as described above with reference to FIGS. 1 and 2 are likewise applicable to the method 300 and have similar effects. For the purpose of simplification, the details will be omitted.

In some embodiments, an apparatus capable of performing the method 200 may comprise means for performing the respective steps of the method 200 and/or 300. The means may be implemented in any suitable form. For example, the means may be implemented in a circuitry or software module.

In some embodiments, the apparatus capable of performing the method 200 comprises: means for transmitting a contention free random access (CFRA) request to a network device during a random access procedure; means for receiving, from the network device, a random access response to the CFRA request, the random access response indicating a transport block size (TBS) granted by the network device for use in transmission; and means for transmitting, to the network device based on the granted TBS, a first data block with the granted TBS or a second data block to be transmitted and stored in a buffer.

In some embodiments, the means for transmitting comprises: means for flushing the buffer for storing the second data block to be transmitted; means for generating the first data block with the granted TBS; and means for transmitting the first data block to the network device.

In some embodiments, the buffer comprises a message 3 (Msg3) buffer, and the second data block comprises a media access control (MAC) protocol data unit (PDU). The means for flushing the buffer comprises: means for determining whether the Msg3 buffer stores the MAC PDU; and means for in response to determining that the Msg3 buffer stores the MAC PDU, flushing the Msg3 buffer.

In some embodiments, the first data block is a media access control (MAC) protocol data unit (PDU) with the granted TBS. The means for generating the first data block comprises: means for multiplexing one or more radio link control (RLC) PDUs into the MAC PDU.

In some embodiments, the means for generating the first data block comprises: means for selecting the first data block with the granted TBS from a set of data blocks to be transmitted.

In some embodiments, the means for flushing the buffer comprises: means for flushing the buffer in response to the granted TBS being smaller than the block size.

In some embodiments, the means for generating the first data block further comprises: means for in response to the granted TBS being larger than the block size, obtaining the second data block from the buffer; and means for generating the first data block based on the second data block.

In some embodiments, the means for generating the first data block based on the second data block comprises: means for generating the first data block by multiplexing and assembling the second data block.

In some embodiments, the means for transmitting comprises: means for in response to the granted TBS being equal to a block size of the second data block, transmitting the second data block to the network device.

In some embodiments, the apparatus capable of performing the method 300 comprises: means for in response to determining that contention free random access (CFRA) resources have been provided for a random access procedure, determining, at a terminal device, contention based random access (CBRA) resources available during the random access procedure; and means for transmitting, to the network device, a CBRA request with the available CBRA resources during the random access procedure.

In some embodiments, the available CBRA resources are predefined.

In some embodiments, the means for determining the available CBRA resources comprises: means for receiving an indication of the available CBRA resources are from the network device.

In some embodiments, the means for determining the available CBRA resources comprises: means for determining an available group of preambles.

In some embodiments, the available group of preambles comprises at least one of the: Random Access Preambles group A and Random Access Preambles group B.

In some embodiments, the means for determining the group of preambles comprises: means for determining whether Random Access Preambles group B is configured; means for if Random Access Preambles group B is configured, determining Random Access Preambles group B as the available group of preambles; and means for if Random Access Preambles group B is not configured, determining Random Access Preambles group A as the available group of preambles.

In some embodiments, the means for determining the available group of preambles comprises: means for determining Random Access Preambles group A as the available group of preambles.

In some embodiments, the means for determining the available group of preambles comprises: means for determining whether Random Access Preambles group B is configured and whether an information element (IE) usePreambleGroupBwithCFRA is configured; and means for if Random Access Preambles group B is configured and the IE usePreambleGroupBwithCFRA is configured, determining Random Access Preambles group B as the available group of preambles, and, otherwise, determining Random Access Preambles group A as the available group of preambles.

In some embodiments, the CBRA request comprises a CBRA preamble selected from the available group of preambles.

In some embodiments, the apparatus further comprises means for determining whether the CFRA resources associated with Synchronization Signal Blocks (SSBs) or Channel State Information Reference Signals (CSI-RSs) have been explicitly provided by the network device by RRC signaling for the random access procedure.

Figure 4:
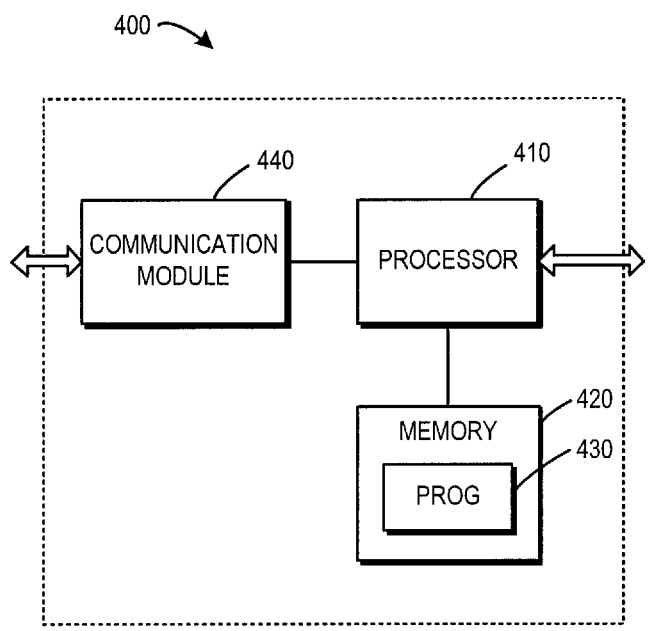
FIG. 4 illustrates a simplified block diagram of a device that is suitable for implementing embodiments of the present disclosure.

FIG. 4 is a simplified block diagram of a device 400 that is suitable for implementing embodiments of the present disclosure. The device 400 can be implemented at or as at least a part of the terminal device 110 as shown in FIG. 1.

As shown, the device 400 includes a processor 410, a memory 420 coupled to the processor 410, a communication module 430 coupled to the processor 410, and a communication interface (not shown) coupled to the communication module 430. The memory 420 stores at least a program 440. The communication module 430 is for bidirectional communications. The communication interface may represent any interface that is necessary for communication.

The program 440 is assumed to include program instructions that, when executed by the associated processor 410, enable the device 400 to operate in accordance with the embodiments of the present disclosure, as discussed herein with reference to FIGS. 2-6. The embodiments herein may be implemented by computer software executable by the processor 410 of the device 400, or by hardware, or by a combination of software and hardware. The processor 410 may be configured to implement various embodiments of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

All operations and features related to the terminal device 110 as described above with reference to FIGS. 1-3 are likewise applicable to the device 300 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 200 and 300 as described above with reference to FIGS. 1-3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A method comprising:
   at a terminal device, transmitting a contention free random access (CFRA) request to a network device during a random access procedure;
   receiving, from the network device, a random access response to the CFRA request, the random access response indicating a transport block size (TBS) granted by the network device for use in transmission; and
   in response to the granted TBS being larger than a block size of a second data block stored in a buffer, transmitting, to the network device based on the granted TBS, a first data block with the granted TBS, wherein the first data block is generated based on the second data block.

2. The method of claim 1, wherein the transmitting comprises:
flushing the buffer for storing the second data block to be transmitted;
generating the first data block with the granted TBS; and
transmitting the first data block to the network device.

3. The method of claim 2, wherein the buffer comprises a message 3 (Msg3) buffer and the second data block comprises a media access control (MAC) protocol data unit (PDU), and flushing the buffer comprises:
determining whether the Msg3 buffer stores the MAC PDU; and
in response to determining that the Msg3 buffer stores the MAC PDU, flushing the Msg3 buffer.

4. The method of claim 1, wherein the transmitting comprises:
in response to the granted TBS being equal to a block size of the second data block, transmitting the second data block to the network device.

5. A computer program product comprising a non-transitory computer-readable medium bearing computer program code embodied therein for use with a computer, the computer program code comprising code for performing the method of claim 1.

6. A device comprising:
at least one processor; and
at least one memory including computer program code;
the at least one memory and the computer program code configured to, with the at least one processor, cause the device to:
transmit a contention free random access (CFRA) request to a network device during a random access procedure;
receive, from the network device, a random access response to the CFRA request, the random access response indicating a transport block size (TBS) granted by the network device for use in transmission; and
in response to the granted TBS being larger than a block size of a second data block stored in a buffer, transmit, to the network device based on the granted TBS, a first data block with the granted TBS, wherein the first data block is generated based on the second data block.

* * * * *